(12) United States Patent
Sujan et al.

(10) Patent No.: US 10,113,637 B2
(45) Date of Patent: Oct. 30, 2018

(54) INTEGRATED POWERTRAIN SYSTEM

(71) Applicant: Cummins, Inc., Columbus, IN (US)

(72) Inventors: Vivek A. Sujan, Columbus, IN (US); J. Steven Kolhouse, Columbus, IN (US); Gary C. Salemme, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 515 days.

(21) Appl. No.: 14/711,977

(22) Filed: May 14, 2015

(65) Prior Publication Data

US 2015/0330503 A1 Nov. 19, 2015

Related U.S. Application Data

(60) Provisional application No. 61/993,483, filed on May 15, 2014.

(51) Int. Cl.
| | |
|---|---|
| *F16H 59/60* | (2006.01) |
| *F16H 59/74* | (2006.01) |
| *F16H 61/02* | (2006.01) |
| *F16H 61/16* | (2006.01) |

(52) U.S. Cl.
CPC .............. *F16H 59/60* (2013.01); *F16H 59/74* (2013.01); *F16H 61/02* (2013.01); *F16H 61/0213* (2013.01); *F16H 61/16* (2013.01); *F16H 2059/743* (2013.01); *F16H 2061/0232* (2013.01); *F16H 2061/0234* (2013.01); *F16H 2061/163* (2013.01)

(58) Field of Classification Search
CPC ... F16H 59/60–2059/666; F16H 59/74–59/78; F16H 61/0213–2061/0244; F16H 61/16–2061/168
See application file for complete search history.

(56) References Cited

U.S. PATENT DOCUMENTS

| | | | |
|---|---|---|---|
| 4,905,544 A * | 3/1990 | Ganoung | B60W 30/18 477/109 |
| 5,070,832 A | 12/1991 | Hapka et al. | |
| 5,166,879 A * | 11/1992 | Greene | F16H 59/62 477/125 |
| 5,484,350 A | 1/1996 | Ishikawa et al. | |
| 5,832,400 A | 11/1998 | Takahashi et al. | |
| 6,246,941 B1 | 6/2001 | Sayman | |
| 6,311,118 B1 | 10/2001 | Ito et al. | |
| 6,389,346 B1 | 5/2002 | Gianoglio et al. | |

(Continued)

*Primary Examiner* — Justin Holmes
*Assistant Examiner* — David R Morris
(74) *Attorney, Agent, or Firm* — Foley & Lardner LLP

(57) ABSTRACT

A system for a vehicle includes a powertrain system including an engine, a transmission, a drive shaft, and a final drive; and a controller communicably coupled to the powertrain system. The controller is structured to: receive a shift schedule for the transmission of a vehicle, the shift schedule indicating when shift events occur based on operation of the vehicle; receive vehicle operation data during operation of the vehicle, the vehicle operation data including a current combustion recipe for the engine; determine a predicted impact of a scheduled shift event on a fuel consumption rate of the vehicle based on the current combustion recipe for the engine; determine an adjustment to the scheduled shift event based on the predicted impact; and provide a command to implement the adjustment to the scheduled shift event to the transmission of the vehicle.

15 Claims, 7 Drawing Sheets

(56) References Cited

U.S. PATENT DOCUMENTS

| | | | |
|---|---|---|---|
| 6,561,145 B1 | 5/2003 | Stockhausen et al. | |
| 7,650,224 B2 | 1/2010 | Andrea et al. | |
| 7,987,034 B2 | 7/2011 | Taffin | |
| 8,099,220 B2 | 1/2012 | Kim et al. | |
| 8,145,376 B2 | 3/2012 | Sherony | |
| 8,187,149 B2 | 5/2012 | Koenig | |
| 8,255,152 B2 | 8/2012 | Barth et al. | |
| 8,332,108 B2 | 12/2012 | Kresse et al. | |
| 8,442,732 B1 | 5/2013 | Steeby | |
| 8,452,509 B2 | 5/2013 | Sujan et al. | |
| 8,504,258 B2 | 8/2013 | Tiberg | |
| 8,543,302 B2 | 9/2013 | Yoshikawa et al. | |
| 8,585,550 B2 | 11/2013 | Watanabe et al. | |
| 8,676,455 B2 * | 3/2014 | Busdiecker | F16H 61/0213 701/54 |
| 2011/0106388 A1 | 5/2011 | Boeckenhoff et al. | |
| 2011/0130938 A1 * | 6/2011 | Seok | B60W 10/06 701/93 |
| 2012/0116647 A1 | 5/2012 | Pochner et al. | |
| 2012/0197500 A1 * | 8/2012 | Sujan | B60W 50/0097 701/51 |
| 2012/0221217 A1 | 8/2012 | Sujan et al. | |
| 2013/0038438 A1 | 2/2013 | Olsen et al. | |
| 2013/0151090 A1 | 6/2013 | Chae et al. | |
| 2013/0173124 A1 | 7/2013 | Palmer | |
| 2013/0184949 A1 | 7/2013 | Saito et al. | |
| 2013/0297161 A1 | 11/2013 | Gibson et al. | |
| 2014/0019022 A1 | 1/2014 | Kresse et al. | |
| 2014/0142822 A1 | 5/2014 | Li | |
| 2014/0172252 A1 | 6/2014 | Siegel et al. | |
| 2014/0172253 A1 | 6/2014 | Palmer et al. | |
| 2015/0198240 A1 | 7/2015 | Ajimoto | |
| 2015/0329119 A1 * | 11/2015 | Sujan | B60W 30/18072 701/54 |
| 2015/0330500 A1 * | 11/2015 | Sujan | F16H 61/0213 701/55 |
| 2015/0345622 A1 * | 12/2015 | Sujan | F16H 61/0213 701/55 |

\* cited by examiner

INTEGRATED POWERTRAIN SYSTEM

CROSS-REFERENCE TO RELATED APPLICATIONS

This application claims the benefit of U.S. Provisional Patent Application No. 61/993,483, filed May 15, 2014, which is incorporated herein by reference in its entirety.

TECHNICAL FIELD

The present disclosure relates to powertrain systems for a vehicle. More particularly, the present disclosure relates to dynamically controlled transmission systems for the optimization of one or more vehicle operating parameters (e.g., fuel economy, etc.).

BACKGROUND

In a vehicle, the powertrain or powertrain system refers to the components that provide the power to move the vehicle. These components include the engine, transmission, drive/propeller shaft, differentials, and final drive. For an internal combustion engine, the engine combusts a fuel to generate mechanical power. This power rotates a crankshaft of the engine. The transmission receives the rotating crankshaft and manipulates the engine speed (i.e., the rotation of the crankshaft) to output a desired rotation speed of the drive/propeller shaft. The rotating drive shaft is received by a differential, which transmits the rotational power to a final drive to effect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel). The final drive refers to the wheels, propeller, or other movement-producing device of the vehicle.

Because the engine speed does not always equate to a desired final drive speed (and, consequently, vehicle speed), the transmission manipulates the engine speed to affect the drive shaft speed for the desired vehicle speed. To achieve a different drive shaft speed relative to the engine speed, some transmission systems utilize a plurality of gears that either increase or decrease the drive shaft rotational speed relative to the engine speed using various gear ratios (e.g., 2:1, which indicates that the engine is rotating twice as fast as the output speed). Gear selection can be done by an operator of the vehicle or automatically without operator input and can be based on engine speed, vehicle speed, throttle position, and load on the engine. For example, during highway driving, the transmission may use a high gear that provides a relatively higher transmission output speed (i.e., speed of propeller/driver shaft) than a low gear to maintain/achieve the relatively greater vehicle speed needed for highway driving. As such, the transmission allows the vehicle to achieve desired vehicle speeds and powers largely independent of the engine.

However, engine manufacturers and transmission manufacturers typically do not share relevant or pertinent data with one another. For example, fueling table information may be closely held with the engine manufacturer. Accordingly, operational improvement of the engine and the transmission is done independent of one another. Due to this lack of integration, a need exists for improving the operation of the system as a whole.

SUMMARY

One embodiment relates to a method comprising receiving a shift schedule for a transmission of a vehicle, the shift schedule indicating when shift events occur based on operation of the vehicle; receiving vehicle operation data during operation of the vehicle; receiving a desired operating characteristic of a vehicle operating parameter; determining a predicted impact of a scheduled shift event on the vehicle operating parameter based on the vehicle operation data; determining an adjustment to the scheduled shift event based on the predicted impact on the vehicle operating parameter; and providing a command to implement the adjustment to the scheduled shift event to the transmission of the vehicle.

Another embodiment relates to a system for a vehicle. The system includes a powertrain system including an engine, a transmission, a drive shaft, and a final drive; and a controller communicably coupled to the powertrain system. The controller is structured to: receive a shift schedule for the transmission of a vehicle, the shift schedule indicating when shift events occur based on operation of the vehicle; receive vehicle operation data during operation of the vehicle, the vehicle operation data including a current combustion recipe for the engine; determine a predicted impact of a scheduled shift event on a fuel consumption rate of the vehicle based on the current combustion recipe for the engine; determine an adjustment to the scheduled shift event based on the predicted impact; and provide a command to implement the adjustment to the scheduled shift event to the transmission of the vehicle.

Still another embodiment relates to a system for a vehicle. The system includes a powertrain system including an engine, a transmission, a drive shaft, and a final drive; an exhaust aftertreatment system; and a controller communicably coupled to the powertrain system and the exhaust aftertreatment system. The controller is structured to: receive a shift schedule for the transmission of a vehicle, the shift schedule indicating when shift events occur based on operation of the vehicle; receive vehicle operation data during operation of the vehicle, the vehicle operation data including a current emissions characteristic of the exhaust aftertreatment system; determine a predicted impact of a scheduled shift event on an exhaust emissions parameter based on the current emissions characteristic; determine an adjustment to the scheduled shift event based on the predicted impact; and provide a command to implement the adjustment to the scheduled shift event to the transmission of the vehicle.

Yet another embodiment relates to a system for a vehicle. The system includes a powertrain system including an engine, a transmission, a drive shaft, and a final drive; and a controller communicably coupled to the powertrain system. The controller is structured to: receive a shift schedule for the transmission of a vehicle, the shift schedule indicating when shift events occur based on operation of the vehicle; receive a route of the vehicle; receive route data for the route of the vehicle in advance of the vehicle traveling the route; determine a predicted impact of a scheduled shift event on a vehicle operating parameter based on the route data; determine an adjustment to the scheduled shift event for one or more segments of the route based on the predicted impact; and provide a command to implement the adjustment to the scheduled shift event for one or more segments of the route to the transmission of the vehicle.

These and other features, together with the organization and manner of operation thereof, will become apparent from the following detailed description when taken in conjunction with the accompanying drawings.

DETAILED DESCRIPTION OF VARIOUS EMBODIMENTS

Figure 1:
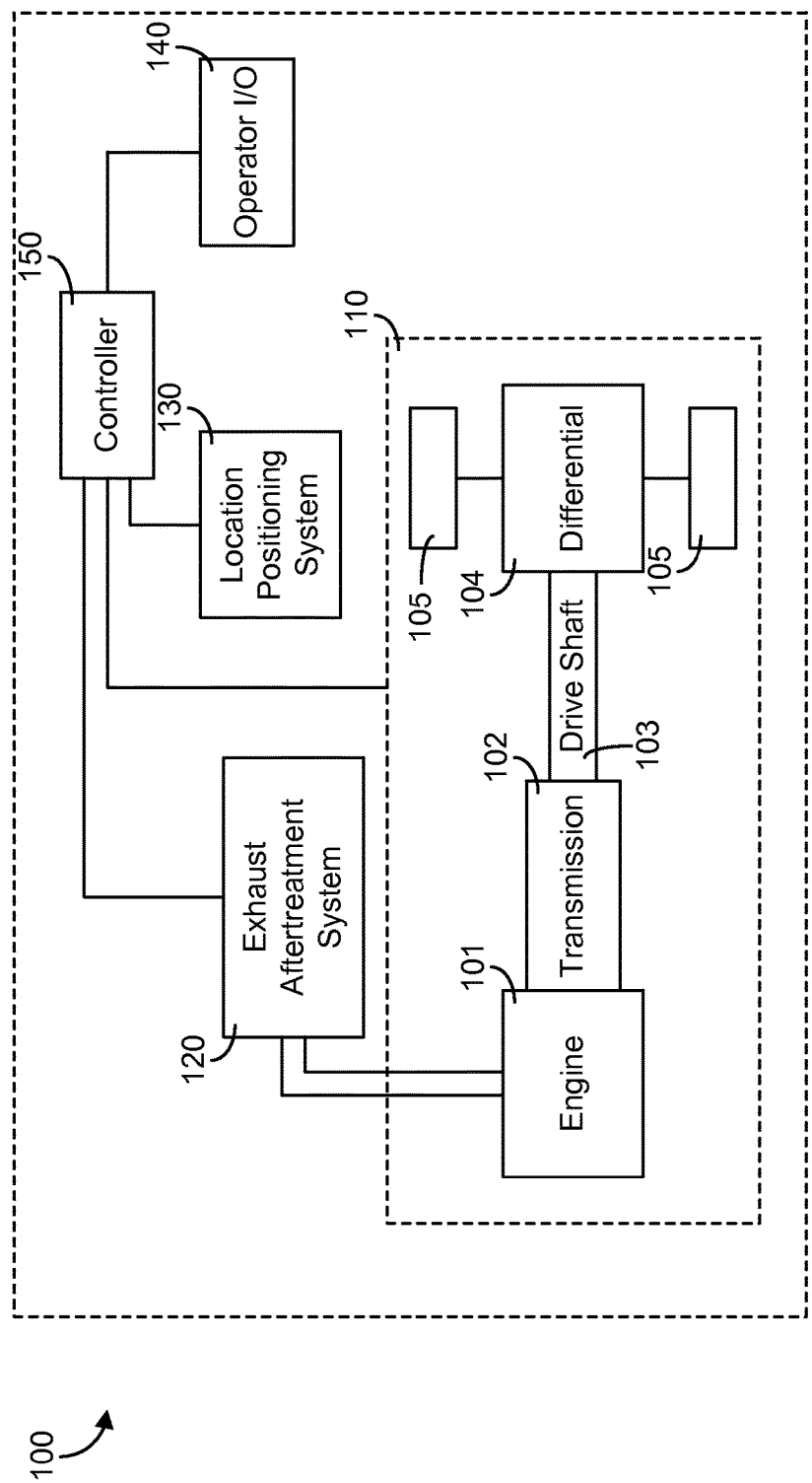
FIG. 1 is a schematic diagram of a powertrain system coupled to a controller in a vehicle according to an example embodiment.

Referring to the Figures generally, the various embodiments disclosed herein relate to systems and methods of controlling a transmission for a vehicle. According to the present disclosure, a controller may be operatively and communicably coupled to an internal combustion engine and a transmission of the vehicle. Due to this integration, the controller may receive data from both the engine and the transmission in addition to the vehicle itself in real time or substantial real time. The controller utilizes this data to dynamically adjust the shift schedule (i.e., one or more shift events) of the transmission in order to optimize or improve a selected vehicle operating parameter. As an abbreviated example application, the vehicle may be traveling through mountains (i.e., relatively high altitude areas) and the selected parameter to optimize is fuel consumption. Due to this high altitude, the engine has different requirements for combustion than a vehicle traveling near sea level. According to the present disclosure, the controller may determine whether an adjustment of one or more scheduled shift events for the transmission should occur by determining the impact of a scheduled shift event on fuel economy selectively adjusting the shift event(s) based on that determination (e.g., if the scheduled shift event would result or likely result in relatively worse fuel economy, than the controller provides a command to stay in the current setting even if this extended duration is counter to the original shift schedule, etc.). While this example is described in regard to fuel economy, due to the integrated system, the controller may improve operational characteristics of other vehicle operating parameters as well, such as engine noise, exhaust emissions, etc.

As used herein, the term "shift schedule" refers to when and to what gear (if the transmission is geared) shift events happens. For example, at approximately 2,500 revolutions-per-minute ("RPM") and rising, the transmission will shift to a next higher gear (e.g., $2^{nd}$ gear to $3^{rd}$ gear). Typically, shift schedules are predetermined by transmission manufacturers, such that they are not integrated with the engine or the rest of the vehicle. As also used herein, the term "shift event" refers to the transmission undergoing a shift (i.e., a change in transmission setting) to manipulate the speed of the drive/propeller shaft relative to the engine speed. As transmissions vary from geared to continuous configurations (e.g., continuous variable transmission), the term "shift event" is not limited to just an increase or decrease in gears (e.g., $3^{rd}$ to $2^{nd}$ gear). Rather, the term "shift event" encompasses any type of engine speed manipulation (setting) performed by the transmission. For example, a shift event in a continuous variable transmission indicates either an increase/decrease in the ratio of input-to-output pulley. As such, the term "shift event" (and "shift schedule") applies to any type of transmission.

Referring generally to FIG. 1, a schematic diagram of a controller communicably coupled to a powertrain system as well as other components in a vehicle is shown according to an example embodiment. The vehicle 100 may be a hybrid vehicle, a full electric vehicle, internal combustion engine powered vehicle like shown, and/or any other type of vehicle that utilizes/includes a transmission. As such, the vehicle 100 may be configured as an on-road or an off-road vehicle including, but not limited to, line-haul trucks, mid-range trucks (e.g., pick-up truck), tanks, airplanes, and any other type of vehicle that utilizes a transmission. The vehicle 100 is shown to generally include a powertrain system 110, an exhaust aftertreatment system 120, a location positioning system 130, an operator input/output (I/O) device 140, and a controller 150.

The powertrain system 110 facilitates power transfer from the engine 101 to power the vehicle 100. Accordingly, the powertrain system 110 includes an engine 101 operably coupled to a transmission 102, a drive shaft 103, and a differential 104, where the differential 104 transfers power output from the engine 101 to the final drive (shown as wheels 105) to propel the vehicle 100. As a brief overview, the engine 101 receives a chemical energy input (e.g., a fuel such as gasoline or diesel) and combusts the fuel to generate mechanical energy, in the form of a rotating crankshaft. The transmission 102 receives the rotating crankshaft and manipulates the speed of the crankshaft (i.e., the engine RPM) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any engine including any type of internal combustion engine (e.g., compression-ignition or spark-ignition) that can be powered by any fuel type (e.g., diesel, ethanol, gasoline, etc.). Similarly, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

As also shown, the vehicle 100 includes an exhaust aftertreatment system 120 in fluid communication with the engine 101. The exhaust aftertreatment system 120 receives the exhaust from the combustion process in the engine 101 and reduces the emissions from the engine 101 to less environmentally harmful emissions (e.g., reduce the NOx amount, reduce the emitted particulate matter amount, etc.). As the example in FIG. 1 is a diesel-powered vehicle 100, the exhaust aftertreatment system 120 includes any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor).

Figure 2:
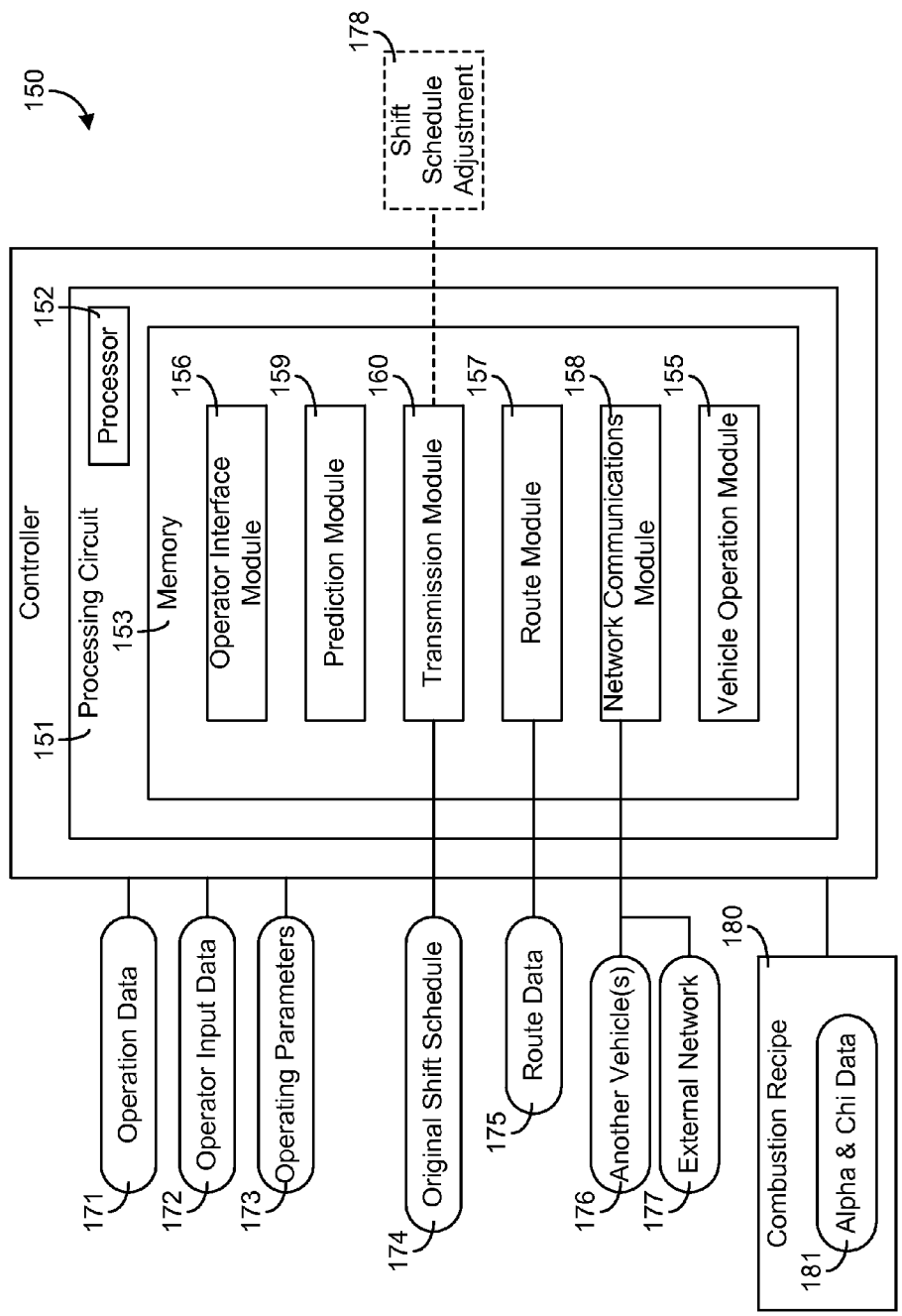
FIG. 2 is a schematic diagram of the controller of FIG. 1, according to an example embodiment.

As explained more fully in regard to FIG. 2, the location positioning system 130 is structured to receive route data (e.g., route data 175) for a route of the vehicle 100. The location positioning system 130 can therefore be structured as any location system, such as a global positioning system communicably coupled to one or more satellites, and the like. In operation, the operator input/output device 140 enables an operator to specify a route of the vehicle. In some embodiments, the controller 150 divides the route into one or more route segments. The division may be based on a distance (e.g., one-hundred feet, one length of a line-haul truck, etc.), terrain (e.g., an uphill portion, a downhill portion, and a flat portion), or any another route dividing characteristic. As such, the route data may correspond with each particular route segment. For example, road curvature and altitude levels may be specific to each route segment. Further, after specification of the route, the controller 150 can receive the route data in advance of the vehicle 100 traveling the route (prior to each route segment traversal). The route data may include any type of data indicative of a characteristic of a route for the vehicle. Accordingly, the route data may include, but is not limited to, an indication of a curvature, a grade, a speed limit, the number of lanes, and the like for one or more segments of the route. As explained herein below, the controller 150 may utilize the route data and in some embodiments, in connection with the vehicle operating data, to adjust a shift schedule (or a shift event thereof) for the transmission 102 of the vehicle 100.

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission, a cruise control input setting, etc. Via the input/output device 140, the operator can designate preferred characteristics of one or more vehicle parameters. When the transmission is structured as an automatic transmission, the operator may input a desire to optimize fuel economy or minimize engine noise via the input/output device 140. The controller 150 dynamically adjusts the shift schedule of the transmission 102 in accord with the operator's input. When the transmission 102 is structured as a manual transmission, the operator input/output device 140 provides an instruction of when and to what gear/setting the operator should shift to in accord with the operator's inputted desired operating characteristic(s).

As shown, the controller 150 is communicably coupled to the powertrain system 110, the exhaust aftertreatment system 120, the location positioning system 130, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., signals, values, etc.) from one or more of the components shown in FIG. 1. The vehicle operating data may be received via one or more sensors (e.g., a speed sensor attached to the engine) attached to the components in FIG. 1.

As the components of FIG. 1 are shown to be embodied in a vehicle 100, the controller 150 may be structured as an engine control module (ECM). The ECM may include a transmission control unit and any other control unit included in a vehicle (e.g., exhaust aftertreatment control unit, powertrain control module, etc.). The function and structure of the controller 150 are shown described in greater detail in FIG. 2.

Accordingly, referring now to FIG. 2, the function and structure of the controller 150 are shown according to one example embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the controller 150 and provide computer code or instructions to the controller 150 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes a vehicle operation module 155, an operator interface module 156, a route module 157, a network communications module 158, a prediction module 159, and a transmission module 160. The modules are configured to selectively adjust a transmission shift schedule for the vehicle 100 responsive to a determined impact on a chosen operating parameter(s) for the vehicle. While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In one embodiment, the operator interface module 156 is communicably coupled to the operator I/O device 140, such that the operator interface module 156 may receive one or more inputs 172 from an operator or a passenger in the vehicle. In another embodiment, the operator interface module 156 includes the operator I/O device 140. Both such variations are intended to fall within the scope of the present disclosure. The input data 172 may include any type of input provide by a user of the I/O device 140 or of the vehicle 100 in general and can be in any format (e.g., voice commands, physical inputs, electronic inputs (e.g., an email message, etc.), etc.). In one embodiment, the input data 172 can also include one or more operating parameters 173 and desired operating characteristics thereof.

Vehicle operating parameters 173 can include, but are not limited to, engine noise, trip time (e.g., from point A to point B), number of gear shifts, transient operation power (e.g., accelerate from 0-60 MPH, accelerate from 55-60 MPH, etc.), fuel consumption rate and other fluid consumption rates (e.g., diesel exhaust fluid, coolant, oil, etc.), power output, an emissions characteristic, etc. Accordingly, a desired operating characteristic of the vehicle operating parameters 173 includes one of a minimization and a reduction of a fuel consumption rate, an engine noise level, a NOx emissions amount, and the like. Reduction and minimization (and other relative and quantifiable terms, such as an "increase" or "larger") may be defined via the I/O device 140 and stored within the operator interface module 156. Of course, these terms may be highly configurable for each application, and a few examples are as follows. In regard to an engine noise level, a "reduction and a minimization" may be in regard to a current decibel level within the cab of the vehicle (e.g., a decibel or sound sensor may take an initial reading (when the vehicle is started) and the operator may define a desired characteristic of at least a five percent reduction). Or, the operator may define a decibel threshold value within the cab and/or external the cab (e.g., outside of the hood, etc.). Additionally, the engine noise level may be based on a baseline engine noise level during various operating conditions (e.g., steady state, transient, etc.). Accordingly, a desired operating characteristic may be to reduce the baseline noise level by a predefined amount, a percentage amount, to a designated threshold, etc. In another example and in regard to one of a minimization and a reduction of fuel consumption, this may be defined based on various operating conditions (e.g., the operator may input a desired operating characteristic of a 17 miles-per-gallon highway and 12 miles miles-per-gallon city). Alternatively, the operator may define a threshold desired characteristic for the aggregate fuel consumption rate (combined highway and city driving). Additionally, the operator may designate a desired fuel consumption rate for a designated route. In still another example and in regard to an emissions amount, the operator may define a desired emissions rate during steady state and transient operating conditions. The operator may further define a desired emissions rate for one or more designated routes (e.g., due to the relatively more stringent emission requirements in California, the operator may desire an even lower NOx and particulate matter emissions amount during routes through California in order to ensure or substantially ensure compliance, etc.). While denoted as thresholds above, the thresholds may correspond to a specific value, a value with an associated tolerance band of acceptable amounts, a range, etc. Based on one or more of these desired operating characteristics of one or more operating parameters 173, as described herein below, the controller 150 is structured to determine one or more adjustments to the shift schedule for the transmission 102 to facilitate achievement or substantial achievement (e.g., an acceptable deviation amount such as a predefined percentage amount or a predefined acceptable range with respect to one or more parameters) of the desired characteristic of the operating parameter(s) 173.

The vehicle operation module 155 is structured to receive operation data 171. The operation data 171 provides an indication of operating conditions experienced by the vehicle 100. The operation data 171, also referred to as vehicle operation data, may include but is not limited to, the vehicle speed, the current transmission gear/setting, the load on the vehicle/engine, the throttle position, a set cruise control speed, data relating to the exhaust aftertreatment system 120, output power, engine speed, fluid consumption (e.g., fuel consumption rate, diesel exhaust fluid consumption rate, etc.), any received engine/vehicle faults (e.g., a fault code indicating a low amount of diesel exhaust fluid), engine operating characteristics, etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst). Accordingly, in certain embodiments, the vehicle operation module 155 may include one or more flow sensors, pressure, sensors, temperature sensors, and other data acquisition devices. In this regard and in certain embodiments, the vehicle operation module 155 may include one or more sensors operable to acquire the aforementioned data, such as temperature sensors, flow sensors, pressure sensors, speed sensors, fluid level sensors, oxygen sensors, mass air flow sensors, and the like.

The route module 157 is structured to receive route data 175 indicative of a terrain of a designated route for the vehicle 100. In one embodiment, the route data 175 is provided by the location positioning system 130. In another embodiment, the location positioning system 130 is included with the route module 157, such that the route data 175 may simply be recalled or communicated to the module 157 at will. The route data 175 includes, but is not limited to, latitude data, longitude data, altitude data, posted speed limits, grades, signage for the routes, and curvature data for the route. In some embodiments, the controller 150 divides the route into one or more route segments. The route segments correspond with substantially continuous portions of route data (e.g., the altitude for this portion of the route stays substantially the same). Accordingly, the route data 175 may correspond with each one of the segments of the route. Latitude and longitude data provides an indication of the location of the vehicle. Altitude data provides an indication of the level of elevation of the route to, for example, indicate downhill and uphill portions of the route. Curvature data provides an indication of the curves in the route.

While the route module 157 provides data indicative of the upcoming terrain of a designated route of the vehicle 100, this type of data is largely static in nature in that the route data 175 may not provide an indication of real-time changes or occurrences happening in the route ahead (e.g., the road curvature, altitude, and the like are predominately non-changing variables). Furthermore, the vehicle operation data 171 may be limited to those conditions currently experienced by the vehicle 100. Accordingly, the network communications module 158 is structured to receive data to dynamically determine the terrain conditions upcoming or likely upcoming for the vehicle 100 (e.g., based on a designated route for the vehicle). The network communications module 158 is structured to communicate with at least one of another vehicle 176 (e.g., via short-range to medium-range wireless communication, etc.) and an external network 177 (e.g., a central server, database, a fleet manager, a traffic center, global positioning systems, etc.) to establish an intelligent transportation system (ITS). In this regard and in some embodiments, the network communications module 158 may include communications circuitry that facilitate the exchange of information between and among the another vehicles 176 and the external network 177. The communications circuitry may allow the network communications module 158 to send and/or receive data regarding the vehicle 100, other vehicles, traffic conditions, road conditions, and the like. The network communications module 158 may provide an operator with real-time travel and traffic information via the operator I/O device 140, such as transit routes and schedules, navigation directions, and information about delays due to congestion, accidents, weather conditions, road repair work, etc. In some embodiments, the network communications module 158 is able to inform an operator of the vehicle 100 in real-time of his/her precise location, inform him/her of current traffic or road conditions on a current and/or surrounding roadways, and empower him/her with optimal route selection and navigation instructions. Further, the network communications module 158 may receive information/data regarding one or more other vehicles. The communication between the vehicles may be vehicle-to-vehicle or vehicle-to-server-to-vehicle (i.e., vehicle-to-"x" type communication). The vehicle-to-vehicle communication circuitry that may, in some embodiments be included with the module 158, be performed via any suitable short to medium range wireless communications protocol (e.g., Wi-Fi, infrared, radio, RFID, near-field communications (NFC), Bluetooth, etc.). The vehicle-to-server-to-vehicle (generally, vehicle-to-x) communication circuitry that may, in some embodiments be included with the module 158, be performed via any suitable long range wireless communications protocol. The data regarding the other vehicle(s) may include, but not limited to, a current speed of the other vehicle, a current location of the other vehicle, a type of the other vehicle, and the like. The current speed of the other vehicle may include an absolute speed of the other vehicle or a relative speed of the other vehicle in relation to the vehicle 100. The current location of the other vehicle may include an absolute location of the vehicle (e.g., GPS coordinates, etc.) or a relative distance of the other vehicle in relation to the vehicle 100.

The prediction module 159 is structured to determine an impact on one or more operating parameters 173 based on at least one of the data from the vehicle operation module 155, the data from the route module 157, and the data from the network communications module 158. In this regard, the impact determined may be as a function of current, expected, and dynamic operating conditions (i.e., vehicle operation module 155, route module 157, and network communications 158 respectively). Advantageously, this type of structure facilitates the optimization or improved operation of one or more selected operating parameters 173 continuously in a dynamic forward-looking manner.

Figure 3:
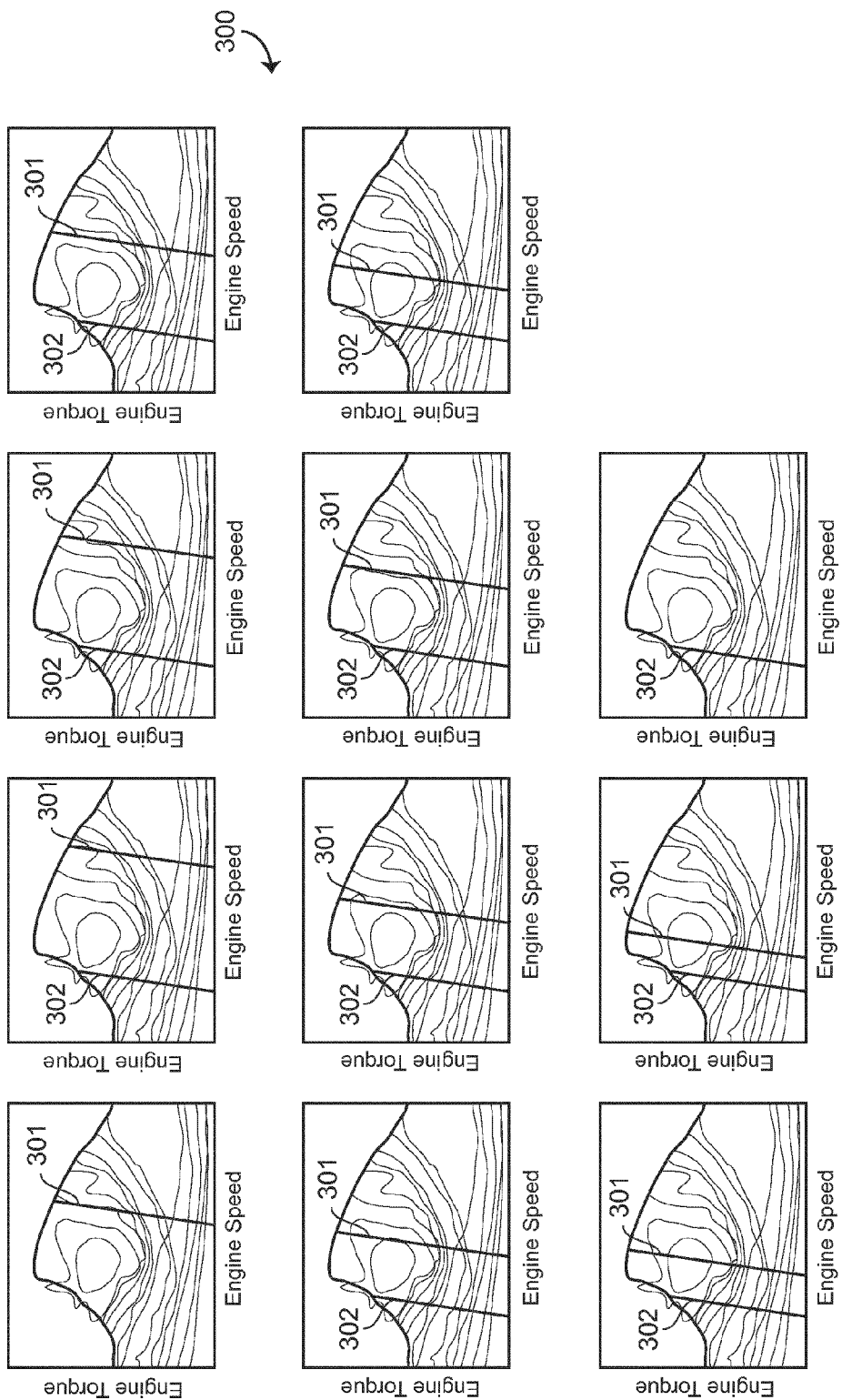
FIG. 3 is a diagram of a shift schedule for a transmission of a vehicle, according to an example embodiment.

As briefly mentioned above, the prediction module 159 is structured to determine the impact based on implementation of an original shift schedule 174. Referring now to FIG. 3, an example shift schedule for an eleven-speed transmission is shown according to an example embodiment. The shift schedule depicts not only when shift events occur but also the torque-speed curve associated therewith for each setting. In use with the prediction module 159, this information may be detailed as a look-up table or formatted in any other use-facilitating format. The slanted lines 301 represent the upshift operating conditions (e.g., from second to third gear) where the slanted lines 302 represent the downshift operating conditions (e.g., from second to first gear). Collectively, the graphs 300 represent an example shift schedule for a transmission. Conventionally, shift schedules are unshared with engine manufacturers such that operational control of the transmission with regard to one or more engine operating conditions was not possible. According to the present disclosure, the engine 101 and transmission 102 may be arranged in an integrated system, such that the exchange of information is provided.

With knowledge of the shift schedule 174, the prediction module 159 can back-calculate or forward-calculate the torque or estimated torque based on an implementation of a scheduled shift event pursuant to the shift schedule 174. As explained above, operation of the transmission 102 works to manipulate the engine 101 speed to affect a desired drive shaft 103 and final drive 105 speed. Similarly, the transmission 102 manipulates the engine 101 output torque to provide a desired torque to the drive shaft 103 and final drive 105 in order to achieve or substantially achieve a desired vehicle speed. However, due to the ability of the transmission 102 to operate at a different speed and torque than the engine 101, the transmission 102 may also affect the engine output torque and speed. Further, as shown in FIG. 3, the upshift and downshift points for each gear are shown as a function of engine speed and engine torque. That is to say, different engine speed and torque combinations define when gear shifts should occur and to which gear for each transmission gear/setting. Therefore, by using the predefined transmission settings, the prediction module 159 may determine an expected post-shift engine speed and torque.

One such example is assuming a constant power output through the shift event (e.g., if the engine was outputting 100 kilowatts pre-shift, the engine will output 100 kilowatts after the shift). For example, a four-speed transmission may correspond with transmission ratios of 4:1, 3:1, 2:1, and 1:1 (provided in an input-to-output notation, e.g., engine input-to-transmission output). In this case and based on the operation data 171, if the engine is at 6000 RPM and 200 foot-pounds of torque in first gear and an upshift occurs to second gear, the engine speed will be pulled down to 4500 RPM with a torque of 150 foot-pounds (i.e., 6000 RPM×¾=4500 RPM and 200 foot-pounds×¾=150 foot-pounds). If an upshift to third gear occurs nearly instantaneously following the shift to second gear, the engine speed will be further pulled down to 3000 RPM and the torque reduced to 100 foot-pounds. Thus, by knowing the torque-speed curve (shown in FIG. 3, which also shows the shift points for each transmission setting), the expected torque and engine speed may be determined by the prediction module 159 if a shift event were to occur. Those of ordinarily skill in the art will readily appreciate that the above determination torque and speed determination process is only one example as many other algorithms, models, look-up tables, and the like may be used independent of or in combination with the above example. Other processes may utilize estimates for losses (e.g., the aerodynamic power drag based on the current speed and grade of the vehicle) to achieve a better estimate for the post-shift torque and speed. All such variations are intended to fall within the spirit and scope of the present disclosure.

As mentioned above, the above formulation (e.g., the transmission multiplier) is based on a constant or substantially constant power output. However, as mentioned above, other embodiments may utilize more complicated models, equations, formulas, and the like. For example, in other embodiments, at least one of a loss and an ensuing transient (e.g., loss of power, control, etc. during the shift) may be used to determine the impact by the prediction module 159. In regard to losses, Applicants have determined that the engine and powertrain have different quantities/amounts of losses at different speeds (vehicle and engine). For example, in third gear, if 100 kilowatts is being asked for at the wheels, the engine may need to output 110 kilowatts to account for losses (e.g., parasitic losses such as the alternator, pumps, bearings, friction, etc.). However, in fourth gear, to maintain 100 kilowatts at the wheels, the engine may only need to output 107 kilowatts. This is due to a higher engine speed causing relatively more efficient operation (less losses) from various parasitic load. Thus, and in regard to this example, the losses may go down from 10 to 7 kilowatts after the upshift. Accordingly, by integrating the transmission and the engine, the controller 150 of the present disclosure may account for this characteristic.

As mentioned above, the prediction module 159 may also utilize ensuing transients from/during the shift to determine the predicted impact. Utilizing ensuing transients may avoid gear-hunting events by an operator to ensure or substantially ensure relatively more efficient operation of the vehicle. For example, and in regard to route data 175 or the dynamic data 176-177, the prediction module 159 may determine that an uphill grade is upcoming while the vehicle is currently on a predominately flat grade. Accordingly, the prediction module 159 may determine that a pre-approach (to the uphill grade) upshift should occur to increase the vehicle speed, but the uphill grade is fairly short in length. Accordingly, the prediction module 159 alters the determination to maintain the current gear to avoid losses from multiple shifts and to decrease the number of shifts.

Accordingly and as mentioned above, in one embodiment, the prediction module 159 determines the impact on engine torque and speed with and without a scheduled shift event. The determined, estimated, predicted, etc. engine torque and speed may then be used to determine an impact on one or more operating parameters 173, such as fuel consumption. In regard to fuel consumption, in addition to determining a torque and speed with and without a scheduled shift event (described above), the prediction module 159 may also receive combustion recipe data 180. In this regard, the prediction module 159 may include a fueling controller for controlling or substantially controlling combustion in the engine 101. "Combustion recipe" refers to the conditions required or substantially required for combustion in the engine 101. As such, the combustion recipe includes the timing and quantity of fueling to the engine (e.g., both an amount of fuel and air, a brake specific fuel consumption, etc.) as well as the timing and amount of exhaust gas recirculation used for combustion (i.e., an EGR fraction). To facilitate relatively fast fueling instructions (i.e., combustion recipe) for the engine 101, the fueling controller may utilize alpha and chi data 181. Such alpha and chi data 181 may also be provided or included with the prediction module 159. In one embodiment, the alpha and chi data 181 are arranged in a plurality of tables that define a spectrum of different operating conditions for the engine 101 and/or aftertreatment system 120, with associated combustion recipes for each combination of the conditions. More particularly, the alpha data may be arranged in a first table associated with steady-state conditions and a second table associated with transient operating conditions. Steady-state operating conditions may refer to relatively constant engine torque and speed conditions and relatively constant aftertreatment system temperatures. In comparison, transient operating conditions may refer to excursions of torque and speed (beyond a predefined acceptable amount or range) and excursions in temperature in the aftertreatment system. In other embodiments, the steady-state and transient operating conditions may be based on other operation data of the engine and/or aftertreatment system. Those of ordinary skill in the art will recognize that many different parameters may be used to define steady-state and transient conditions. In comparison, the chi data may be arranged in multiple tables associated with non-typical operating states (e.g., a derate state, a high altitude state, a thermal management state, a cold calibration state, an SCR thermal management state, etc.). Conditions associated with each non-typical operating state may be predefined via the operator interface module 156 and may vary widely from engine type and aftertreatment system type/configuration. For example, a high altitude state may correspond with elevations above a certain threshold; a cold operating state may correspond with ambient temperatures below a threshold; a derate state may correspond with engine torque output being limited to at or below a threshold; etc. These non-typical operating states may be determined from operation data 171, an operator input 172, and any other identifying characteristic. Further, alpha and chi fueling maps (e.g., tables, models, etc.) may be used for each engine and/or aftertreatment system configuration. Accordingly, the alpha and chi maps may each define a plurality of fueling conditions for the various operating conditions with a plurality of maps included with the controller 150. It should be understood that in other embodiments, the alpha and chi data 181 may be arranged in models, equations, algorithms, and the like that replace and/or complement the tables described herein above. Further, in some embodiments, the brake specific fuel consumption (BSFC) map may be used independent of such data tables (in regard to fuel economy), where the BSFC map may correspond with the specific fuel consumption as a function of engine torque and power. In this regard, the prediction module 159 may examine the BSFC map (e.g., model, look-up table, etc.) based on the determined engine torque and speed to see if a shift adjustment should occur (e.g., if the BSFC is greater with a shift, then the shift occurs, etc.).

So, in use, based on the operation data 171, a current vehicle speed and transmission setting may be known to the prediction module 159. Based on a trajectory of vehicle speeds, the projection module 159 may determine that the speed of the vehicle is increasing or decreasing. Accordingly, the prediction module 159 can determine whether an upshift or a downshift event is forthcoming or likely forthcoming. The prediction module 159 may then determine an expected torque and speed for the engine for the upshift or downshift event (whichever is likely to occur based on the speed trajectory). The prediction module 159 may then reference the alpha and chi data 181 (and/or BSFC map) to determine the fuel consumption rate or likely fuel consumption rate at that gear setting with that torque and speed. This predicted fuel consumption rate may be compared to the current fuel consumption rate and responsive to this comparison, the transmission module 160 may make an adjustment to the shift schedule 178 to achieve or substantially achieve an increase in fuel economy (i.e., the desired operating characteristic of the operating parameter of fuel economy). For example, the prediction module 159 may determine that fueling increases with the scheduled upshift or downshift, such that the transmission module 160 determines to delay the scheduled upshift or downshift. This determination may be continuously re-run in real time or substantially in real time such that the upshift or downshift event may happen at an optimum timing. In a manual transmission vehicle, the adjustment may be provided to the driver via the I/O interface 140 while in an automatic transmission vehicle, the adjustment 178 may occur automatically.

In certain embodiments, the prediction module 159 may make the impact determinations based on the speed trajectory and with other gears in addition to a transmission setting that is one up or one down from the current setting. In this regard, the prediction module 159 may determine a skip-shift event (e.g., from $3^{rd}$ gear to $1^{st}$ gear) is best to achieve or substantially achieve the desired characteristic of the vehicle operating parameter 173.

In other embodiments, the prediction module 159 may make a determination to other vehicle parameters 173. For example, the vehicle operation module 155 may be pre-programmed with a variety of noise levels for various operating conditions. The prediction module 159 may reference these, e.g., look-up tables to see how the noise changes based on a shift event to determine if that aligns or substantially aligns with the desired noise level.

Figure 4:
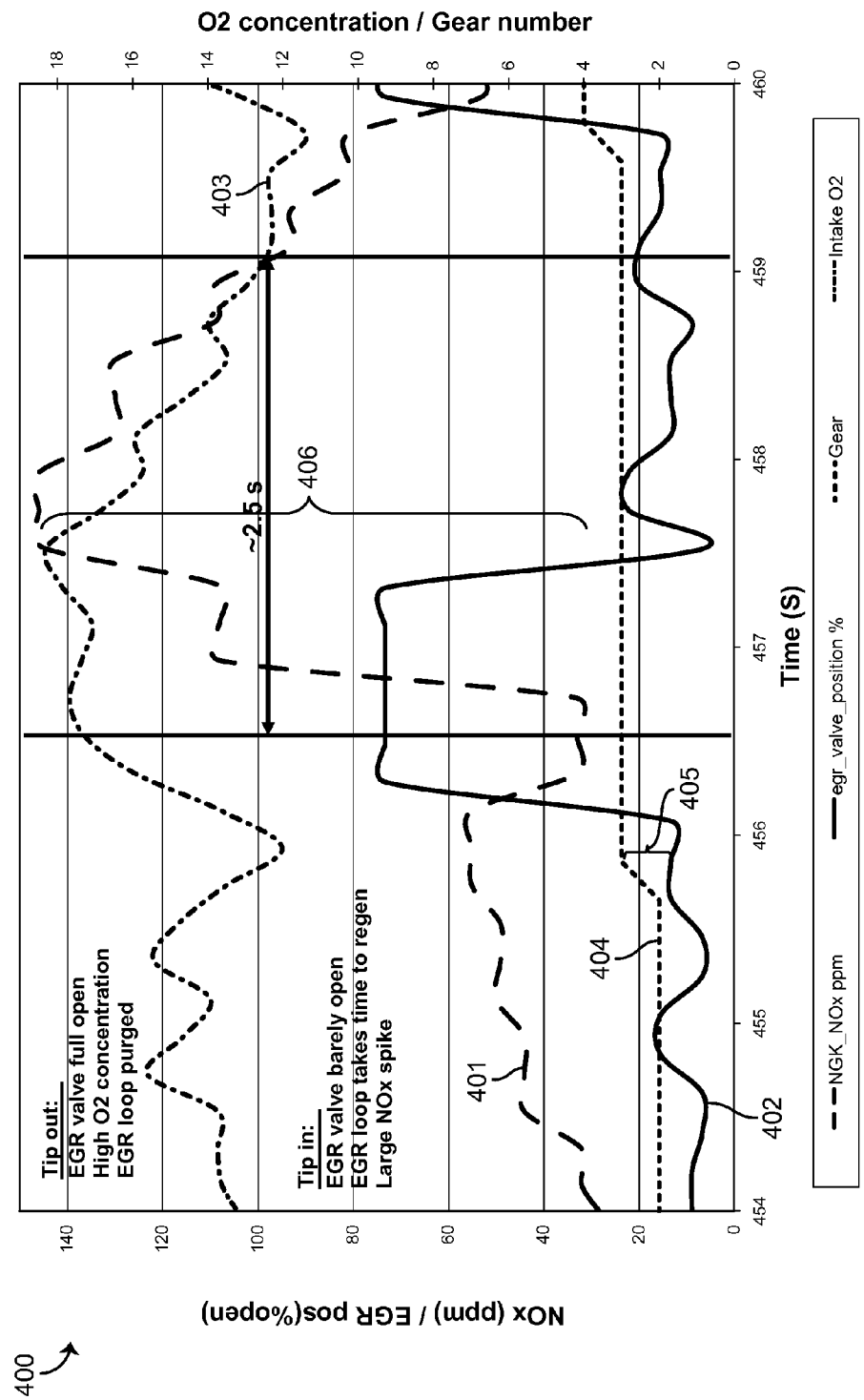
FIG. 4 is a diagram illustrating the effect of a transmission shift on an output of nitrous oxide (NOx), according to an example embodiment.

Or, in another example in regard to an emissions characteristic, the vehicle operation module 155 may include a variety of parameters that are indicative of various emissions amount (e.g., at X engine speed and Y torque in Z transmission setting, an expected NOx emissions amount is AA amount). Thus, the prediction module 159 may determine how a shift event may impact the emissions amount. For example, referring now to FIG. 4, a graph is shown how a shift affects NOx emissions, according to an example embodiment. Graph 400 includes curve 401, which represents an engine NOx parts-per-million (ppm) output amount, curve 402 which represents the EGR valve position, curve 403 which represents an intake oxygen amount, and curve 404 which represents the a gear shift event. At region 405, a gear shift occurs. In response, a substantial spike (region 406) in NOx occurs. Based on this Applicant-acquired data, the prediction module 159 may determine how a scheduled shift event may impact NOx emissions from an aftertreatment system (in connection with the operation data 171, which provides an indication of the EGR valve position). Accordingly, the prediction module 159 may determine that a delay to a scheduled shift event is beneficial to maintain NOx emissions below a certain desired threshold based on the operation data 171. The prediction module 159 may determine that when the EGR position is at X percent, then the scheduled shift event should occur as this will reduce the spike of NOx emissions. The above example is not meant to be limiting as other types of formulas, models, look-up tables, correlations, and the like may be used for determining an aftertreatment system affect (e.g., a resultant temperature on one or more components, etc.) based on implementation of a scheduled shift event and without the scheduled shift event.

While the above examples of the prediction module 159 are described primarily in regard to the current operation data 171, advantageously the prediction module 159 is also communicably coupled to the route module 157 and the network communications module 158. In this regard, the route data 175 may provide an indication of a speed limit for various parts of the route as well as the upcoming terrain. For forecasting purposes, a user may input 172 that they wish to operate the vehicle plus-or-minus five miles-per-hour relative to the speed limit. This speed preference and the acquired grade information may permit the prediction module 159 to determine the power required to propel the vehicle over that segment of the route. Then, the prediction module 159 may determine a likely transmission setting for this speed achievement because each transmission setting has a corresponding recommended vehicle speed range (e.g., first gear is from 0-20 miles-per-hour, second gear is from 18-32 miles-per-hour, etc.). The prediction module 159 may then utilize each potential transmission setting to determine the characteristics of the parameter at each setting. The transmission setting corresponding with the best effect on the desired operating parameter may then be selected as the setting for that route. If an automatic transmission, the transmission setting selected may be implemented automatically. If a manual transmission, the I/O device 140 may provide an instruction to the operator at the specific route segment to implement that transmission setting. In this regard, the transmission setting for a specific portion of a route may be controlled responsive to the desired operating characteristic of the one or more vehicle operating parameters and the route data 175. Furthermore, this determination may be enhanced by the dynamic data associated with the network communications module 158. For example, if another vehicle 176 indicates that a traffic jam is occurring at a particular spot on the route, then the prediction module 159 determines that the shift schedule adjustment determined in regard to the route data may be inapplicable.

An example may be (utilizing route data 175 and dynamic data 176-177) that the vehicle is on the verge of changing alpha and chi tables for some thermal management scenario (e.g., a diesel particulate filter (DPF) regeneration event, etc.) and switching to a lower alpha or chi level. The route data may indicate an upcoming hill. In which case, a relatively higher load may be on the vehicle, such that a DPF regeneration event could occur (to cause higher temperatures in the aftertreatment system). However, the dynamic data 176-177 may indicate that a traffic jam is occurring on the hill. In which case, the prediction module 159 (based on the desire to perform a DPF regeneration event) may determine to downshift the current transmission setting rather than facilitate the DPF event on the hill. To maintain approximately the same vehicle speed, this downshift will cause a relatively high engine speed for the downshift transmission setting, which results in more fueling and relatively higher temperatures to cause the DPF regeneration event. Thus, the prediction module 159 and transmission module 160 have dynamically adjusted operating conditions to achieve or substantially achieve the user preference of a DPF regeneration event.

Responsive to the determined impact and as mentioned above, the transmission module 160 is structured to adjust or potentially adjust the shift schedule 178. In one embodiment, the transmission module 160 includes a transmission controller for the transmission 102. In another embodiment, the transmission module 160 is communicably coupled to the transmission controller. In the latter embodiment, the transmission module 160 may include communication circuitry configured to establish a communications network with the transmission controller. In still further embodiments, the transmission module 160 may include one or more actuators that can selectively adjust the transmission setting of the transmission 102 (e.g., a hydraulic actuator that moves a dog clutch in the transmission 102 to engage various gear settings, etc.).

The shift adjustment 178 includes delaying a scheduled shift event, skipping a shift event, a modification of the scheduled shift event, and/or an early implementation of the shift event. A delayed shift event refers to prolonging the shift event passed when it otherwise would occur per the shift schedule. A skip of the shift event refers to bypassing a schedule shift event completely. A modification to the shift event refers to a shift to a gear other than the schedule gear per the shift schedule (e.g., a shift to $5^{th}$ gear from $3^{rd}$ gear rather than $4^{th}$ gear). As opposed to a delay in the shift event, an early implementation of the shift event indicates a shift to the scheduled shift event ahead of when it otherwise would occur per the shift schedule. In some embodiments, the adjustment is counter the shift schedule for the transmission.

Figure 5:
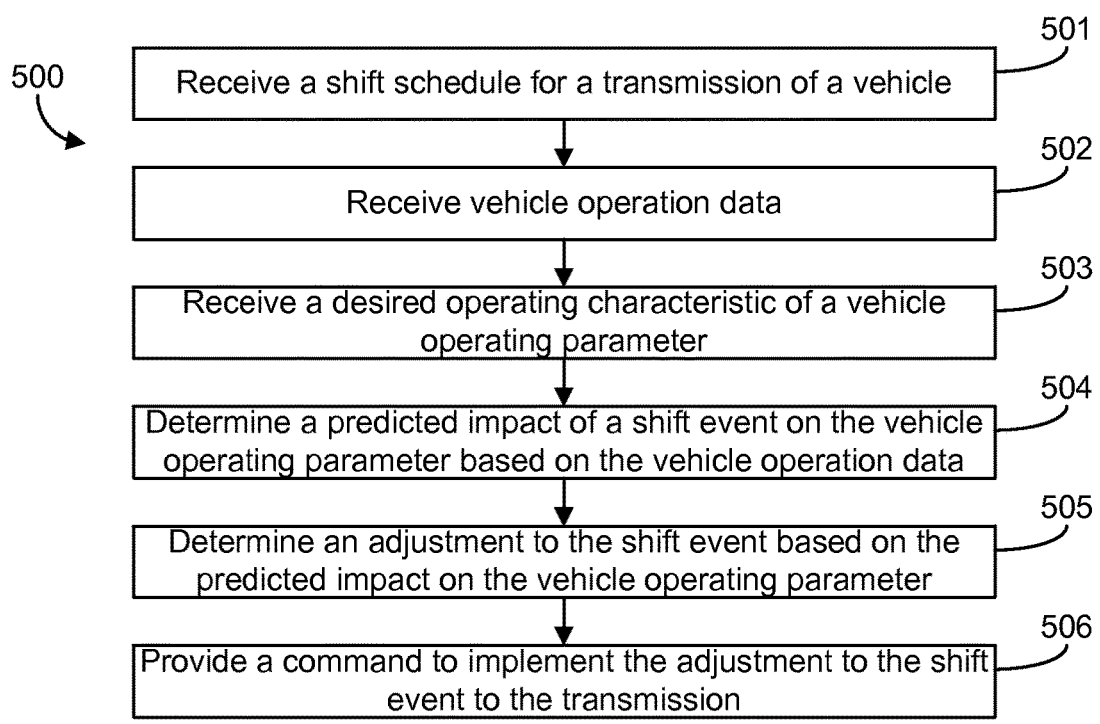
FIG. 5 is a flow diagram of a method of dynamically controlling a transmission according to an example embodiment.

Referring now to FIG. 5 in relation to FIGS. 1-4, a method 500 of dynamically adjusting a shift schedule for the transmission of a vehicle is shown according to an example embodiment. Method 500 may be implemented with the controller 150 of FIGS. 1-2. Accordingly, method 500 may be described in regard to FIGS. 1-2. At process 501, the controller 150 receives a shift schedule for a transmission of the vehicle. As mentioned above, the shift schedule indicates when the transmission undergoes a shift event based on the operating conditions of the vehicle. The shift schedule may also correspond with a torque-speed curve for the engine. During operation of the vehicle, the controller 150 receives vehicle operation data (process 502). The vehicle operation data is obtained from the components and systems shown in FIG. 1. As such, the vehicle operation data includes, but is not limited to, the vehicle speed, the current transmission gear/setting, the load on the vehicle/engine, the current combustion recipe (e.g., using Alpha and Chi tables and/or a BSFC map), the throttle position, a set cruise control speed, data relating to the exhaust aftertreatment system 120, output power, etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst). At process 503, the controller 150 receives a desired operating characteristic of a vehicle operating parameter. At process 504, the controller 150 determines a predicted impact of a scheduled shift event on the vehicle operating parameter. During process 504, the controller 150 utilizes one or more look-up tables, formulas, algorithms, and the like to make the impact determination. If the predicted impact of the shift event would cause or would likely cause the chosen vehicle operating parameter to function improperly (against the desired operating characteristic), the controller 150 determines an adjustment to the scheduled shift event based on the predicted impact (process 505). In other words, the controller 150 optimizes the shift schedule based on the data. In certain embodiments, the impact and shift adjustment determination may be based on lugback management, a performance parameter (e.g., power output), fluid consumption (e.g., fuel and/or diesel exhaust fluid), noise emissions, and location of the vehicle to adjust exhaust emissions. Lugback refers to a change in driving conditions (quick slow down when approaching a hill) that substantially affects the engine speed. For example, a vehicle may be operating at approximately 2,500 RPM and then hit an incline, which increases the load on the engine, and brings the engine speed down to approximately 1,500 RPM. This can create a strain on the engine as the transmission setting likely does not match with the engine speed. Accordingly, lugback management refers to one or more shift adjustments (process 505) that minimize the lugback on the engine. These adjustments may include those described above and pre-shift events and skip shift events, among others. For example, before the vehicle reaches the uphill portion, the controller 150 pre-shifts the transmission to a lower gear/setting in order to reduce the engine speed. Or, in another example, the controller 150 determines that the vehicle is traveling downhill (or about to travel downhill based on route data, see method 500) and downshifts to prevent excess engine speed that could damage the engine powertrain system 110. These examples are in reference to an automatic transmission. In a manual or user-operated transmission, a command may be provided to the I/O device 140 instructing the operator to shift.

As mentioned above, the shift adjustment includes delaying a scheduled shift event as in the above example, skipping a shift event, a modification of the scheduled shift event, and/or an early implementation of the shift event. A delayed shift event refers to prolonging the shift event passed when it otherwise would occur per the shift schedule. A skip of the shift event refers to bypassing a schedule shift event completely. A modification to the shift event refers to a shift to a gear other than the schedule gear per the shift schedule (e.g., a shift to $5^{th}$ gear from $3^{rd}$ gear rather than $4^{th}$ gear). As opposed to a delay in the shift event, an early implementation of the shift event indicates a shift to the scheduled shift event ahead of when it otherwise would occur per the shift schedule. In some embodiments, the adjustment is counter the shift schedule for the transmission. At process 506, the controller 150 provides a command to implement the determined adjustment to the transmission of the vehicle. Example operations of method 500 are shown in regard to FIG. 6.

Figure 6:
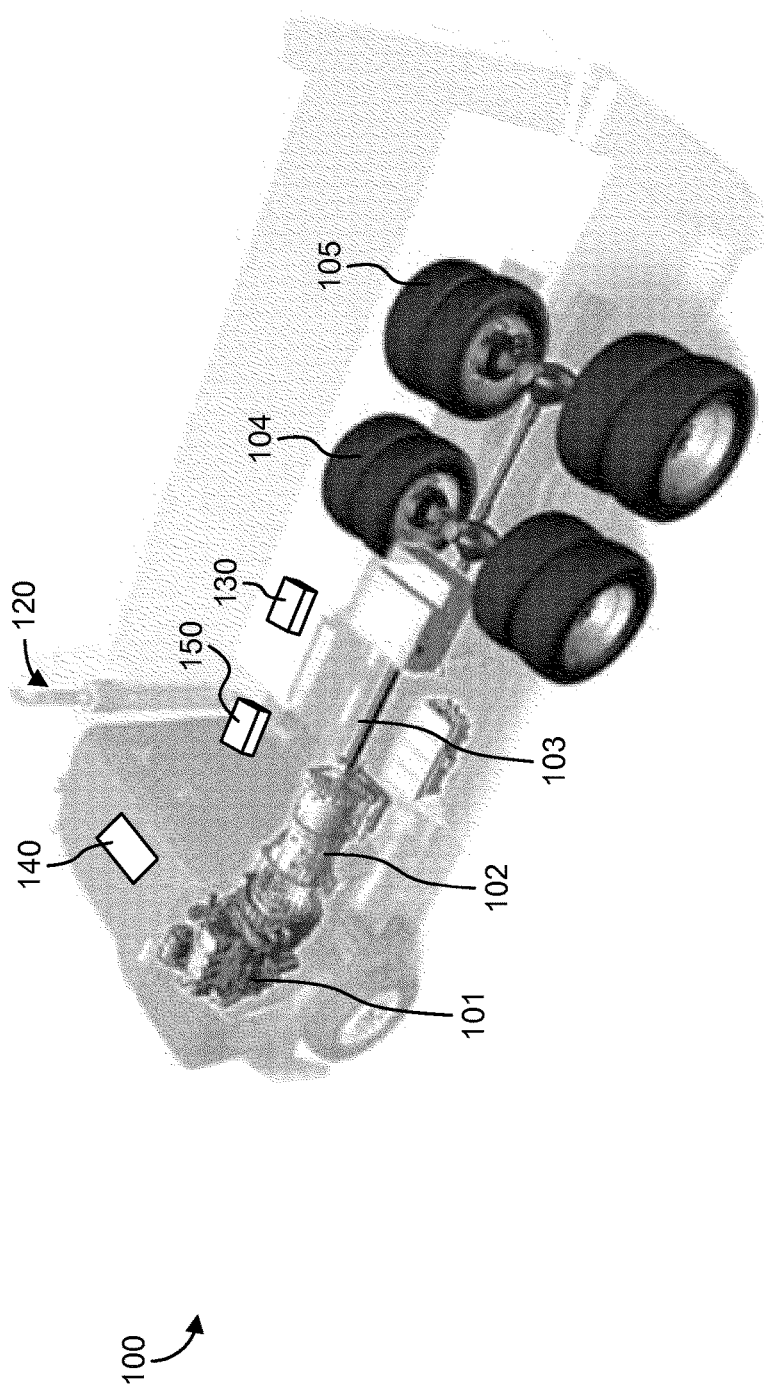
FIG. 6 is a diagram of a vehicle with the systems and components of FIG. 1, according to an example embodiment.

FIG. 6 shows a vehicle 100 with the controller 150 of the present disclosure according to an example embodiment. As shown, the vehicle 100 is structured as a line-haul truck (i.e., a semi-tractor trailer). The vehicle 100 includes the powertrain system 110, an exhaust aftertreatment system 120, a location positioning system 130, an operator input/output device 140, and the controller 150. The controller 150 is structured to perform the operations of method 500. For example, based on the vehicle operation data, the controller 150 determines that the vehicle is achieving 25 miles-per-gallon (MPG). As the grade of the road is increasing, the shift schedule (due to the increase in load) is programmed to upshift. However, the controller 150 determines that the scheduled upshift would result in an MPG below the desired characteristic of 22 MPG. This is because an increase in fueling is needed for that shift event. This may be determined using the Alpha and Chi tables regarding the predicted combustion recipe at the scheduled shift event at the current vehicle operating conditions. As such, the controller 150 determines that the shift event should be delayed (process 505) to conserve fuel (while still being able to maintain the requisite vehicle speed). As such, the controller 150 provides a command to delay this scheduled shift event at process 506.

In another example of method 500, an operator may choose to reduce NOx emissions to be compliant with one or more emissions law. During vehicle operation, the controller 150 may determine that one or more scheduled shift events cause or would likely cause the NOx emissions to be non-complaint (process 504) with one or more predefined characteristics. As a result, the controller 150 determines to adjust one or more shift events in order to maintain or likely maintain compliant NOx emissions (process 505). This adjustment is then provided to the transmission of the vehicle (process 506).

As another example, a city may have a noise emissions ordinance for within city limits that is designed to reduce noise pollution. While driving in that city, the controller 150 determines that a scheduled shift event would cause or likely cause noise in excess of the ordinance (process 504). For example, whenever the transmission is put into a gear, as opposed to neutral, the engine is motoring and is at a relatively louder sound level than in neutral (process 504). Accordingly, the controller 150 determines that the transmission should remain in neutral whenever possible (e.g., whenever the operator does not require additional power for doing a maneuver, such as accelerating) provides a command to implement a "neutral when possible" configuration with the transmission. As such, noise emissions from the engine and vehicle can be controlled to be substantially within the ordinance.

Figure 7:
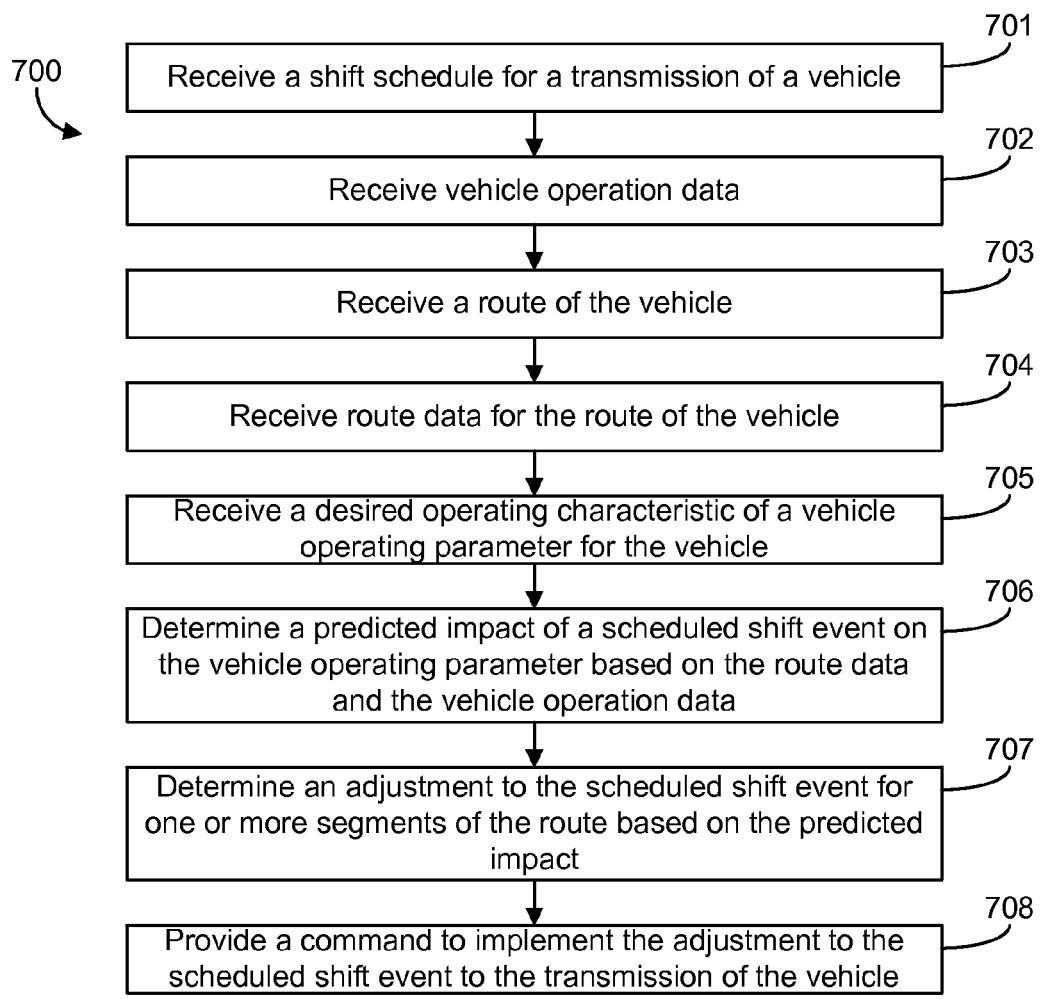
FIG. 7 is a flow diagram of a method of dynamically controlling a transmission based on a route of the vehicle, according to an example embodiment.

Referring now to FIG. 7, a method 700 of dynamically controlling a transmission vehicle based on route data is shown according to an example embodiment. As with method 500, method 700 may be implemented with the controller 150 of FIGS. 1-2. Accordingly, method 700 may be described in regard to FIGS. 1-2. As shown, method 700 contains substantially similar processes as method 500. As with method 500, method 700 begins with the controller 150 receiving a shift schedule for the transmission of a vehicle (process 701). During operation of the vehicle, the controller 150 receives vehicle operation data (process 702). The vehicle operation data is substantially the same as that acquired in process 702 of method 500. At this point, method 700 begins to deviate as compared to method 500.

At process 703, the controller 150 receives a route for the vehicle. The route refers to a start and end point for the vehicle. The route may be received via operator input/output device 140. After designation of the route, the controller 150 receives data for the route (i.e., route data). The route data may be obtained by the location positioning system 130 and provided to the controller 150.

In certain embodiments, the route data is obtained from the past operation of the vehicle over the selected route. The history of transmission settings for each portion of the route (and their effect on certain vehicle operating parameters) can be recalled by the controller 150 (in one or more memory devices, such as memory device 154) to analyze the effects those settings had on various vehicle operating parameters. If certain parameters operated outside of a selected range, then the controller 150 commands a shift event adjustment for those portions of the route. Accordingly, the route data represents forward horizon data for the vehicle (i.e., data conditions that are likely to be experienced by the vehicle at specific future locations in the route).

At process 705, the controller 150 receives a desired operating characteristic of a vehicle operating parameter of the vehicle. As with method 500, vehicle operating parameters include, but are not limited to, engine noise, fuel consumption, power output, an emissions characteristic, etc. Similarly, desired operating characteristics of the vehicle operating parameters includes a minimization of fuel consumption, a reduction of engine noise, and a minimization of NOx emissions, and the like.

At process 706, the controller 150 determines a predicted impact of a scheduled shift event on the vehicle operating parameter based on the route data. At process 707, the controller 150 determines an adjustment to the scheduled shift for one or more route segments based on the predicted impact of the vehicle operating parameter for each segment of the route. If scheduled shift events are determined to cause or likely the vehicle operating parameter to operate outside of the desired range for a route segment, the controller 150 determines an adjustment to the transmission setting in accord with the desired operation of the selected vehicle operating parameter. In other words, the controller 150 determines an optimum transmission setting for each route segment of the route. As with method 500, the controller 150 utilizes one or more algorithms, predictive algorithms, formulas, look-up tables, and the like to determine a predicted impact on the vehicle operating parameter if a scheduled shift event were to occur. However, in regard to process 706, the controller 150 determines the impact of a shift event for the route based on the route data. For example, the route data may indicate that two portions of the route have uphill portions (e.g., above a predefined grade) and fuel economy is selected as the vehicle operating parameter. Using Alpha and Chi tables (described above), the controller 150 determines an optimum transmission setting (e.g., gear) for each specific uphill portion in order to maximize fuel economy (processes 706-707). The optimum gear may differ than a scheduled gear. As with method 500, as described above, the shift adjustment determination (process 707) may be based on lugback management, a performance parameter (e.g., power output), fluid consumption (e.g., fuel and/or diesel exhaust fluid), noise emissions, and location of the vehicle to adjust exhaust emissions.

In some embodiments, the predicted impact is determined based on both the route data and the vehicle operating data. As such, the controller 150 uses the current operating conditions (e.g., combustion recipe) with the route data to determine an optimum transmission setting. For example, based on the route data, the controller 150 determines that two route segments have forty percent grade, two route segments are at a relatively higher altitude (e.g., through the mountains), and the rest of the route is substantially flat such that a steady state operating condition is possible. Using the route data, the controller 150 can determine optimum transmission settings for each segment. However, as the vehicle is traveling through the route, the operating conditions of the vehicle change (e.g., combustion recipe for a warm-up period of the engine is different than when the engine is warmed up). Thus, the controller 150 is optimizing the transmission setting based on these operating conditions. However, because of the route data, the controller 150 determines potential engine loads (from the road grade) and altitude levels (that impact combustion recipes) in advance of the vehicle reaching those portions of the route. As such, the controller 150 can determine that based on the current driving conditions and the upcoming route segment, the transmission setting should be at "X" in order to optimize the selected vehicle operating parameter. In sum, the controller 150 utilizes both pieces of data to optimize the transmission setting in advance of the vehicle traveling the route or a piece of the route.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
   receiving a predetermined shift schedule for a transmission of a vehicle from a remote source;
   interpreting vehicle operation data regarding operation of the vehicle;
   interpreting a desired operating characteristic of a vehicle operating parameter;
   determining a predicted impact of a scheduled shift event of the predetermined shift schedule on the vehicle operating parameter based on the vehicle operation data; and
   selectively adjusting the scheduled shift event in response to the desired operating characteristic and the predicted impact on the vehicle operating parameter,
   wherein selectively adjusting the scheduled shift event includes at least one of a delay of the scheduled shift event, an early implementation of the scheduled shift event, and a skipping of the scheduled shift event, and implementing the adjusted shift event with the transmission.

2. The method of claim 1, wherein the predicted impact includes determining an engine torque and an engine speed by implementing the scheduled shift event and using the determined engine torque and engine speed to determine the predicted impact on the vehicle operating parameter.

3. The method of claim 1, wherein the selective adjustment to the scheduled shift event is in response to the predicted impact indicating that the vehicle operating parameter is outside the desired operating characteristic for the vehicle operating parameter.

4. The method of claim 1, wherein the vehicle operating parameter is a fluid consumption rate of the vehicle and the desired operating characteristic is one of a reduction and a minimization of the fluid consumption rate.

5. The method of claim 4, wherein the fluid consumption rate includes at least one of a fuel consumption rate and a diesel exhaust fluid consumption rate.

6. The method of claim 1, wherein the vehicle operating parameter is an exhaust emissions characteristic, the exhaust emissions characteristic including at least one of a NOx emissions rate, a particulate matter emissions rate, and an exhaust aftertreatment catalyst conversion efficiency.

7. The method of claim 1, wherein the vehicle operating parameter is a noise level of the vehicle and the desired operating characteristic is one of a reduction and a minimization of the noise level.

8. A system for a vehicle, comprising:
   a powertrain system including an engine and a transmission; and
   a controller communicably coupled to the powertrain system, the controller structured to:
      receive a predetermined shift schedule for the transmission from a remote source;
      receive vehicle operation data during operation of the vehicle, the vehicle operation data including a current combustion recipe for the engine;
      determine a predicted impact of a scheduled shift event of the predetermined shift schedule on a fuel consumption rate of the vehicle based on the current combustion recipe for the engine;
      determine an adjustment to the scheduled shift event based on the predicted impact, wherein the adjustment to the shift event includes at least one of a delay to the scheduled shift event, an early implementation of the scheduled shift event, and a skipping of the scheduled shift event; and
      provide a command to implement the adjustment to the scheduled shift event to the transmission of the vehicle.

9. The system of claim 8, wherein the determined predicted impact includes determining an engine torque and an engine speed by implementing the scheduled shift event and using the engine torque and engine speed to determine the predicted impact on the fuel consumption rate.

10. The system of claim 8, wherein the adjustment to the scheduled shift event is in response to the predicted impact indicating that the fuel consumption rate is outside a desired fuel consumption rate.

11. An apparatus, comprising:
    a vehicle operation circuit structured to receive operation data regarding operation of a vehicle;
    a vehicle parameter circuit structured to receive a desired operating characteristic of one or more vehicle parameters;
    a communications circuit structured to receive dynamic data from at least one of another vehicle and an external network;
    a prediction circuit structured to interpret a predetermined shift schedule for the transmission and to determine an impact on the one or more vehicle parameters based on
       an implementation of a scheduled shift event within the predetermined shift schedule with a transmission of the vehicle,
       the operation data, and
       the dynamic data from the at least one of another vehicle and the external network; and
    a transmission circuit structured to selectively adjust the scheduled shift event in response to the desired operating characteristic and the determined impact on the one or more vehicle parameters,
    wherein the selective adjustment includes at least one of a delay to the scheduled shift event of the predetermined shift schedule, an early implementation of the scheduled shift event of the predetermined shift schedule, and a skipping of the scheduled shift event of the predetermined shift schedule.

12. The apparatus of claim 11, further comprising a route circuit structured to receive a designation of a route for the vehicle and route data responsive to the designation, wherein the route data provides an indication of a terrain of the route at a future location for the vehicle.

13. The apparatus of claim 12, wherein the prediction circuit is structured to determine the impact on the one or more vehicle parameters based on implementation of the shift schedule and the route data.

14. The apparatus of claim 11, wherein the impact is based on determining an engine torque and an engine speed from implementing the shift schedule.

15. The apparatus of claim 11, wherein the one or more vehicle parameters include at least one of a lugback management feature, a fluid consumption rate, a noise emissions level, and an exhaust emissions level.

\* \* \* \* \*